Figure 1:
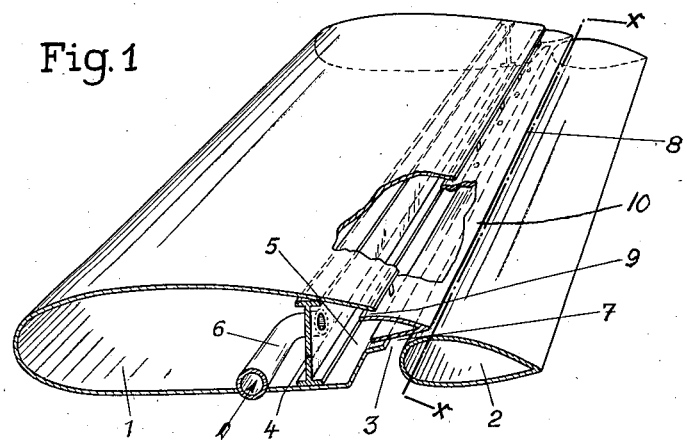

Inventor:
Boris von Schlippe
By *[signature]*
Attorney.

Patented Nov. 24, 1942

2,302,925

UNITED STATES PATENT OFFICE 2,302,925

WING UNIT FOR AIRCRAFT

Boris von Schlippe, Dessau, Germany; vested in the Alien Property Custodian

Application May 24, 1939, Serial No. 275,351
In Germany June 7, 1938

1 Claim. (Cl. 244—40)

Devices for the wing units of aircraft are well known in the art, which serve to influence the boundary layer flowing along the surface of the wing unit, and which are intended to affect favorably the lifting power of the latter. Thus, e. g. devices have been already applied for sucking off the boundary layer streaming along the suction side of the wing unit in order to prevent the boundary layer from breaking away and from forming vortices, and thus to increase the lift to a desired extent particularly at large angles of incidence of the wing unit. However, in order to operate devices of the said type, low pressure-creating systems are required which suck off the comparatively large quantity of the air of the boundary layer. Inasmuch as low pressure producing systems with sufficient output are generally not present in airplanes, the installation of a special system causes a great sacrifice in weight which is undesirable in an aircraft. Furthermore, such devices are known in the art, in which, with the aid of suitable systems, air is conveyed to and exhausted from the suction-side of the wings. This air is heated in most cases and serves mainly the purpose of defrosting the outer surface of the wing. In other cases in which the air leaves slot spaces near the front edge of the wing it is intended to cause a reaction with the aid of particularly shaped outlet apertures when air is discharged, such reaction to be utilized in the propulsion of the craft.

The invention has for an object to provide a device by means of which, even at large angles of incidence of the total wing unit or of parts thereof, the boundary layer is prevented from forming vortices by the admission of a gaseous medium, e. g. air to the suction side of the wing unit, and in which the quantity of air to be conveyed to the suction side of the wing unit need not be very large. For this purpose and according to the invention slot spaces are provided in the rear portion of the wing in front of a movable flap, auxiliary wing or similar member, into which spaces a gaseous medium may be blown in order to influence the boundary layer of the flow.

In this manner, an adherent flow and, thus, an increased suction will be created at that part of the upper wing surface which extends in the rear of said slot space. Such suction will favorably affect also the region of the part of the upper surface in front of the slot space by acting upon the last mentioned part so as to suck off the boundary layer of the flow obtaining at that place. The flap, auxiliary wing or similar member may be swingable over a large angular range with respect to the other parts of wing unit without causing the boundary layer of the flow to break off at or in front of the flap which mostly occurred in devices of conventional design.

For structural reasons, it is advisable to arrange the inlet openings admitting the gaseous medium to the slot space near the rear upper edge of that part of the wing unit which constitutes the front confinement of the slot space since in virtue of its usual shape, this region of said part of the wing unit mostly forms a nozzle which is favorable for the inflow of the gaseous medium into the slot space.

Further objects and details of the invention will be apparent from the description hereinafter and the accompanying drawing illustrating two embodiments thereof by way of example.
In the drawing Fig. 1 is a perspective, diagrammatical view of a portion of a wing unit according to the invention and Fig. 2 is a similar view of a modification.

Referring now to Fig. 1, the illustrated wing unit comprises a main wing part 1 and a flap 2 which is swingable about axis $x$—$x$ with respect to the main wing. Between main wing part 1 and flap 2, there is a nozzle slot 3 into whose space a gaseous medium e. g. compressed air or exhaust gases of an internal combustion engine may be blown.

For this purpose, a distributing chamber 5 is provided in the rear portion of the main wing part 1, and closed towards the front by a wall 4. The gaseous medium may be blown under an increased pressure into chamber 5 through a pipe 6, and may flow from the distributing chamber 5 through apertures 7 of the main wing part 1 into the slot space 3 and from there to the upper surface of the wing unit.

Figure 2:
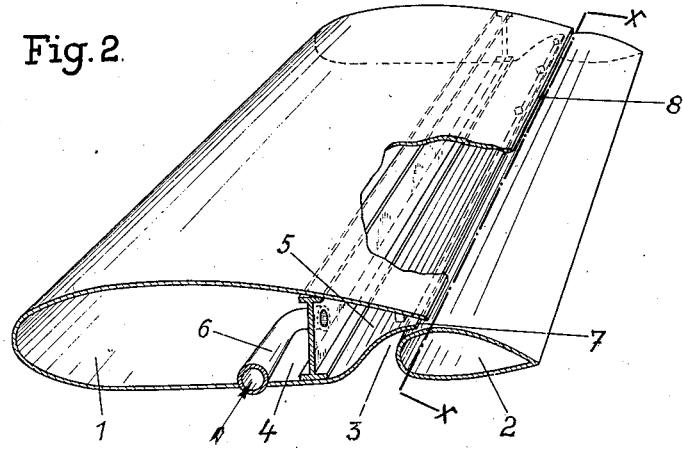

In the embodiment of Fig. 2, the apertures 7 are arranged near the upper rear edge 8 of the main wing part 1, and, thus, in a region of the latter which in virtue of its natural shape constitutes a nozzle-shaped discharge opening for the gaseous medium flowing from the distributing chamber 5 into the slot space 3.

The gaseous medium conveyed to the slot space 3 form a boundary layer together with the air which flows through the slot space from the pressure side of the wing unit to its suction side. This boundary layer adheres to the flap 2, substantially free of vortices, thereby causing the flow to adhere also to the main wing part 1.

In addition thereto, apertures 9 may be provided in the upper surface of the wing, through which gaseous medium may pass from the distributing chamber 5 to the upper side of the main wing part 1 in order to increase still more the favorable action on the boundary layer of the flow.

In the embodiment illustrated in Fig. 1, the apertures 7 and 9 are formed by the surfaces of a hollow substantially wedge-shaped member 10 and the rear edges of the upper and lower walls of the distribution chamber 5 between which walls the thicker portion of said member 10 is arranged in spaced relation thereto. The tapering portion of said member 10 extends rearwardly in such a manner that its top surface constitutes the trailing portion of the main wing part 1, and that its lower surface constitutes the top and rear wall portion of said slot 3.

I claim:

A wing unit for an airplane comprising a main wing part, a substantially wedge-shaped member along the trailing edge of said main wing part, a flap in the rear of said main wing part and swingable relatively thereto, said main wing part including in its rear portion along said flap, a chamber having an upper and a lower wall portion, said wedge-shaped member being arranged with its thicker portion between and in spaced relation to the trailing ends of said wall portions, and with its tapering portion in the rear of said main wing part, said main wing part, said wedge-shaped member and said flap being so arranged in relation to each other as to form therebetween a nozzle-shaped slot, and means for conveying a gaseous medium into said distribution chamber to be exhausted partly between said wedge-shaped member and the lower wall portion of said chamber into said slot, and partly between the upper wall portion and said wedge-shaped member in front of the latter's trailing edge and towards the top surface of the wing unit.

BORIS von SCHLIPPE.